(12) United States Patent
Hara

(10) Patent No.: US 10,569,633 B2
(45) Date of Patent: Feb. 25, 2020

(54) BATTERY MOUNTING STRUCTURE FOR VEHICLE

(71) Applicant: TOYOTA JIDOSHA KABUSHIKI KAISHA, Aichi (JP)

(72) Inventor: Yasuhiro Hara, Odawara (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/120,308

(22) Filed: Sep. 3, 2018

(65) Prior Publication Data

US 2018/0370344 A1 Dec. 27, 2018

Related U.S. Application Data

(62) Division of application No. 15/488,086, filed on Apr. 14, 2017, now Pat. No. 10,173,511.

(30) Foreign Application Priority Data

Apr. 21, 2016 (JP) .................................. 2016-085567

(51) Int. Cl.
*B60R 16/04* (2006.01)
*B60K 1/04* (2019.01)
(Continued)

(52) U.S. Cl.
CPC ................ *B60K 1/04* (2013.01); *B60L 50/66* (2019.02); *B62D 25/025* (2013.01);
(Continued)

(58) Field of Classification Search
CPC .... B60K 1/04; B60K 1/00; B60K 2001/0438;
B62D 25/20; B62D 25/2036; B62D 21/15; B62D 21/11; B62D 21/157; B62D 21/00; B62D 21/02; B62D 21/09; B60L 11/1877; B60L 11/1851; B60L 11/18; H01M 2/1094; H01M 2/1083; H01M 2/1077; H01M 2/1072; H01M 2/10; H01M 2/08; H01M 2/00; H01M 2/1016; H01M 2300/0065; H01M 2220/20
See application file for complete search history.

(56) References Cited

U.S. PATENT DOCUMENTS 7,964,300 B2   6/2011  Nakazawa et al.
8,062,780 B2   11/2011 Yageta et al.
(Continued)

FOREIGN PATENT DOCUMENTS

CN     101142697 A    3/2008
WO     2014/069270 A1 5/2014

*Primary Examiner* — James M Dolak
(74) *Attorney, Agent, or Firm* — Hauptman Ham, LLP

(57) ABSTRACT

A battery mounting structure is provided to prevent water intrusion into a clearance between a battery pack and a floor panel of a vehicle. The battery mounting structure comprises: frame members extending longitudinally on both sides of the vehicle; a floor panel disposed between the frame members; and a battery pack situated underneath the floor panel. A sealing member is interposed between a periphery of the battery pack and a portion extending from a member opposed to the battery pack, and a drain hole is formed in the sealing member to connect an inner side and an outer side of the sealing member.

17 Claims, 9 Drawing Sheets

(51) Int. Cl.
*H01M 2/10* (2006.01)
*B62D 25/02* (2006.01)
*B60L 50/60* (2019.01)
*B62D 25/20* (2006.01)

(52) U.S. Cl.
CPC ....... *H01M 2/1077* (2013.01); *H01M 2/1083* (2013.01); *B60K 2001/0438* (2013.01); *B62D 25/2036* (2013.01); *H01M 2/1094* (2013.01); *H01M 2220/20* (2013.01)

(56) References Cited

U.S. PATENT DOCUMENTS

| | | | |
|---|---|---|---|
| 8,178,226 B2 | 5/2012 | Yageta et al. | |
| 8,210,301 B2 | 7/2012 | Hashimoto et al. | |
| 8,361,642 B2 * | 1/2013 | Hermann | H01M 2/08 |
| | | | 429/159 |
| 8,403,090 B2 | 3/2013 | Fujiwara et al. | |
| 8,875,828 B2 * | 11/2014 | Rawlinson | B60K 1/04 |
| | | | 180/68.5 |
| 8,877,364 B2 | 11/2014 | Hashimura et al. | |
| 9,373,828 B2 | 6/2016 | Kawatani et al. | |
| 9,566,859 B2 | 2/2017 | Hatta et al. | |
| 9,761,851 B2 | 9/2017 | Onodera et al. | |
| 9,865,850 B2 | 1/2018 | Pflueger et al. | |
| 9,884,544 B2 | 2/2018 | Berger et al. | |
| 9,893,395 B2 | 2/2018 | Tsuchiya et al. | |
| 9,899,655 B2 | 2/2018 | Dai | |
| 9,917,293 B2 | 3/2018 | Garin et al. | |
| 9,935,306 B2 | 4/2018 | Garin et al. | |
| 9,991,571 B2 * | 6/2018 | Grass | H01M 10/625 |
| 10,069,179 B2 * | 9/2018 | Murata | B60L 1/003 |
| 10,131,247 B2 * | 11/2018 | Berger | B60L 58/26 |
| 10,153,522 B2 * | 12/2018 | Kimura | H01M 2/1077 |
| 10,160,301 B2 * | 12/2018 | Perlo | B60K 1/00 |
| 10,173,511 B2 * | 1/2019 | Hara | B60K 1/04 |
| 10,183,563 B2 * | 1/2019 | Rayner | B60K 1/04 |
| 10,319,970 B2 * | 6/2019 | Sun | B60K 1/04 |
| 2005/0147874 A1 | 7/2005 | Andersen et al. | |
| 2009/0246606 A1 | 10/2009 | Shimizu | |
| 2015/0291019 A1 | 10/2015 | Matta et al. | |

* cited by examiner

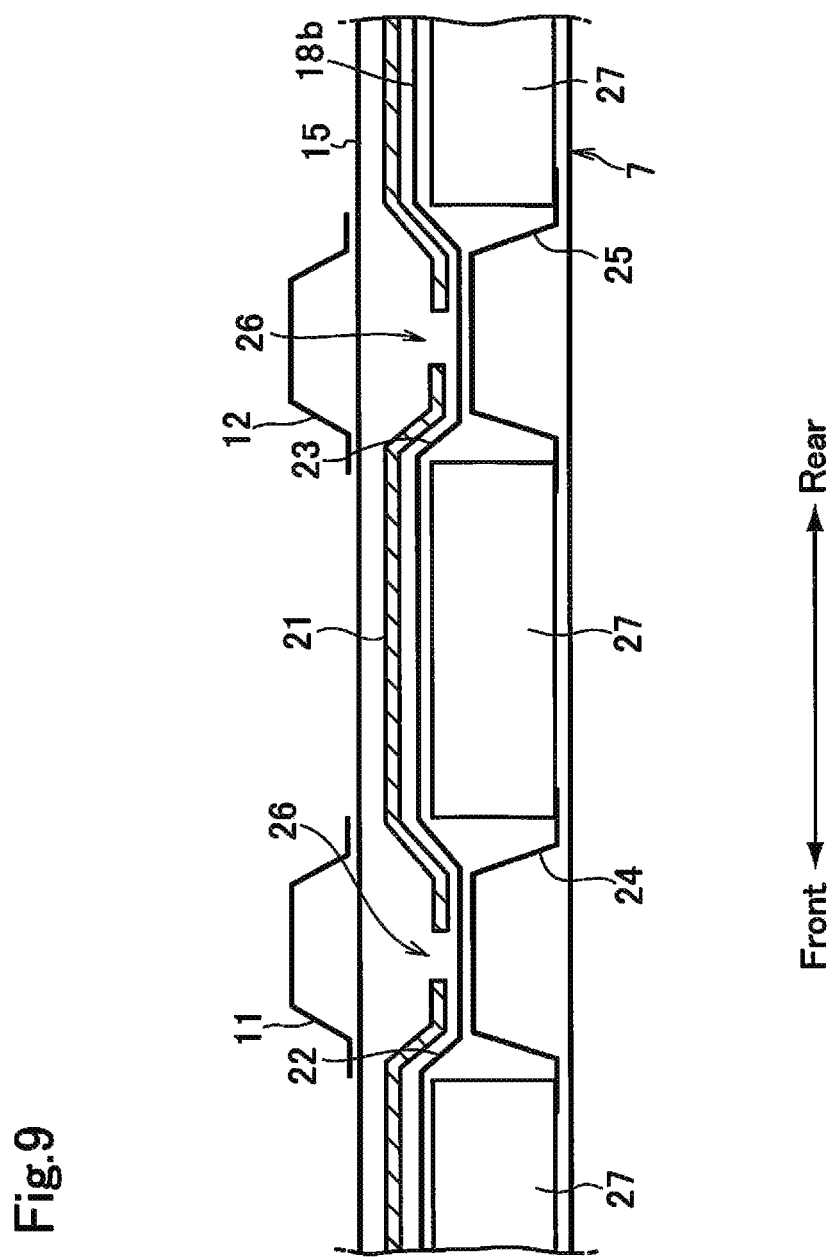

BATTERY MOUNTING STRUCTURE FOR VEHICLE

CROSS REFERENCE TO RELATED APPLICATIONS

The present application is a division of U.S. application Ser. No. 15/488,086, which claims the benefit of priority to Japanese Patent Application No. 2016-085567 filed on Apr. 21, 2016 with the Japanese Patent Office, the entire contents of which are incorporated herein by reference in its entirety.

BACKGROUND

Field of the Disclosure

Embodiments of the present application relate to the art of a structure for mounting a battery for storing electrical energy in a vehicle Discussion of the Related Art PCT international publication No. 2014/069270 describes one example of a battery mounting structure in vehicles. According to the teachings of PCT international publication No. 2014/069270, a battery pack is disposed on a vehicle-body strengthening member below a floor panel. Specifically, the strength member includes a pair of side members extending in the longitudinal direction of the vehicle, and a plurality of cross members for connecting the pair of side members in the width direction. The battery pack is disposed on those members, and the battery pack includes a battery case formed of a battery pack lower frame and a battery pack upper cover. In order to prevent intrusion of water and dust into the battery pack, a clearance between the battery pack lower frame and the battery pack upper cover is sealed by an annular seal member.

Since the battery case taught by PCT international publication No. 2014/069270 is maintained in a liquid-tight condition, not only a short-circuit of the battery but also rust formation of the battery case may be prevented. However, water may intrude into a clearance between the battery pack and the floor panel, and the intruding water may accumulate on the battery pack. Consequently, the intruding water may give out unusual odor and the battery pack may be rusted the by the intruding water.

SUMMARY

Aspects of the present application have been conceived noting the foregoing technical problems, and it is therefore an object of the present application is to provide a battery mounting structure that can prevent water intrusion into a clearance between a battery pack and a floor panel of a vehicle.

Embodiments of the present disclosure relate to a battery mounting structure for a vehicle, comprising: a pair of frame members extending on both sides of the vehicle in a longitudinal direction; a floor panel disposed between the frame members; and a battery pack having a cell stack formed of a plurality of single cells juxtaposed in a predetermined direction, that is situated underneath the floor panel. In order to achieve the above-explained objective, the battery mounting structure is provided with: a sealing member that is interposed between a periphery of the battery pack and a portion extending from a member of the vehicle including the frame member opposed to the battery pack; and a drain hole formed in the sealing member that provides a connection between an inner side and an outer side of the sealing member in a width direction of the vehicle.

In a non-limiting embodiment, the portion extending from the member including the frame member may be overlapped entirely on the periphery of the battery pack, and the sealing member may be arranged entirely on the periphery of the battery pack.

In a non-limiting embodiment, the battery mounting structure may be further provided with a floor cross member extending in the width direction of the vehicle to connect the frame members, and a depression that is formed on a top face of the battery pack in the width direction of the vehicle along a contour of the floor cross member.

In a non-limiting embodiment, the drain hole may be formed in the sealing member at a portion between the depression and the floor cross member.

In a non-limiting embodiment, the portion extending from the member including the frame member includes an inner flange protruding inwardly from at least the frame member.

In a non-limiting embodiment, the drain hole of the sealing member may include end portions isolated away from each other. In addition, the end portions may be overlapped with each other within a predetermined region while keeping a predetermined clearance therebetween in a direction along the top face of the battery pack.

In a non-limiting embodiment, the battery pack may be disposed between the frame members in such a manner that the single cells are juxtaposed in the width direction of the vehicle.

Thus, according to the embodiment of the present application, the sealing member is interposed between the periphery of the battery pack and the portion extending from the member including the frame member opposed to the battery pack. According to the embodiment of the present application, therefore, water intrusion into a clearance between a floor panel and the battery pack may be prevented. In addition, the drain hole is formed in the sealing member to provide a connection between an inner side and an outer side of the sealing member in a width direction of the vehicle. According to the first example, therefore, water condensed on a surface of the battery pack may be drained toward the frame member. For this reason, water accumulation on the top face of the battery pack may be prevented.

BRIEF DESCRIPTION OF THE DRAWINGS

Features, aspects, and advantages of exemplary embodiments of the present invention will become better understood with reference to the following description and accompanying drawings, which should not limit the invention in any way.

FIG. 9 is a partial cross-sectional view showing a fourth example of the battery mounting structure.

DETAILED DESCRIPTION OF THE PREFERRED EMBODIMENT(S)

Figure 1:
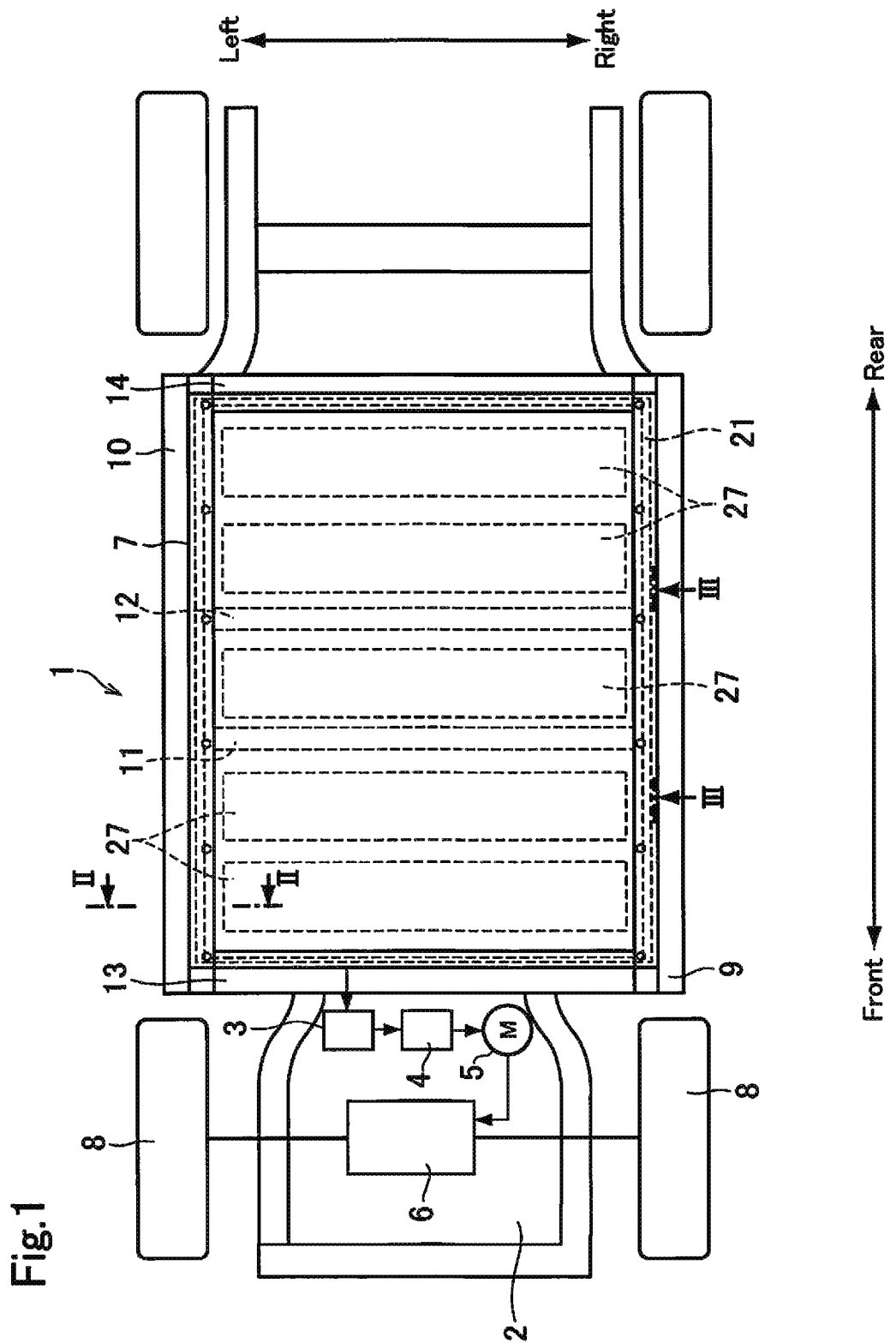
FIG. 1 is a schematic illustration showing one example of a structure of the vehicle to which the battery mounting structure according to the present disclosure is applied.

Hereinafter, embodiments of the present disclosure will be explained with reference to the accompanying drawings. Turning now to FIG. 1, there is shown one example of a bottom structure of a vehicle to which the battery mounting structure according to the present disclosure is applied. In the vehicle 1 shown in FIG. 1, a converter 3, an inverter 4, a motor 5 as an induction motor, and a power transmission unit 6 are arranged in a front compartment 2, and a battery pack 7 as a secondary battery is arranged under a floor panel. The converter 3 is adapted to increase a voltage from the battery pack 7, and to apply the voltage to the inverter 4 while stabilizing. The direct current power supplied from the battery pack 7 is converted into the alternate current power by the inverter 4, and further supplied to the motor 5 while controlling frequency. An output torque of the motor 5 is transmitted to drive wheels 8 through the power transmission unit 6 while being increased or decreased. Here, the inverter 4 may also be connected directly to the battery pack 7 while omitting the converter 3.

In the vehicle 1, a right side sill 9 and a left side sill 10 serving as frame members extend longitudinally parallel to each other on both sides of the vehicle 1 at the same level. Front ends of the right side sill 9 and the left side sill 10 are connected through a front cross member 13 as a lateral reinforcement member, and rear ends of the right side sill 9 and the left side sill 10 are connected through a rear cross member 14 as a lateral reinforcement member. In order to further reinforce the right side sill 9 and the left side sill 10, a first floor cross member 11 and a second floor cross member 12 are disposed laterally underneath a floor panel between the right side sill 9 and the left side sill 10 while keeping a predetermined clearance therebetween in the longitudinal direction. Right ends of the first floor cross member 11 and the second floor cross member 12 are attached to the right side sill 9, and left ends of the first floor cross member 11 and the second floor cross member 12 are attached to the left side sill 10. Each of the first floor cross member 11 and the second floor cross member 12 is a depressed beam member, and the first floor cross member 11 and the second floor cross member 12 are connected to the right side sill 9 and the left side sill 10 in such a manner that the depressions thereof are opened toward the floor panel.

Figure 2:
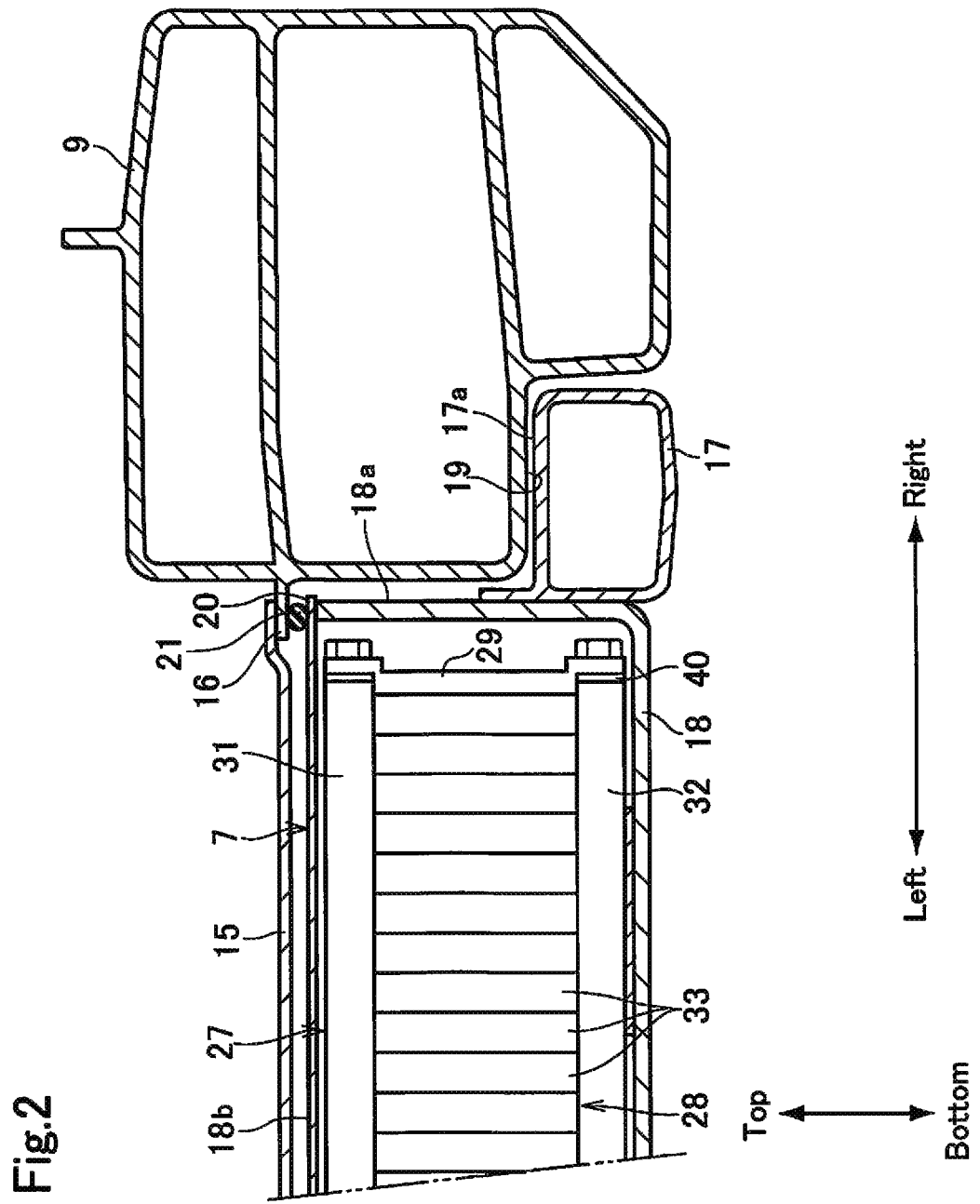
FIG. 2 is a partial cross-sectional view showing a first example of the battery mounting structure along the II-II line in FIG. 1.

FIG. 2 shows a cross-section of the battery mounting structure according to the first example along II-II line in FIG. 1. As depicted in FIG. 2, a floor panel 15 is deposed above the battery pack 7. An inner flange 16 protrudes from an inner side face of the right side sill 9 toward a vehicle component, and a right side of the floor panel 15 is supported by the inner flange 16 of the right side sill 9. Likewise, although not especially shown in FIG. 2, the remaining sides of the floor panel 15 are also supported by the inner flanges 16 of the left side sill 10, the front cross member 13, and the rear cross member 14.

The battery pack 7 is disposed underneath the floor panel 15 between the right side sill 9 and the left side sill 10. The battery pack 7 includes a battery frame 17 as a hollow peripheral reinforcement member, and a box-shaped casing 18 for holding fuel cell stacks 28 therein. A height of the battery frame 17 is shorter than that of the casing 18, and the battery frame 17 is attached around a lower part of sidewalls 18a of the casing 18 in such a manner as to align bottoms of the battery frame 17 and the casing 18. That is, the battery frame 17 is expanded from the sidewalls 18a of the casing 18. A lower inner corner of the right side sill 9 is depressed to form a depression 19 to be engaged with the battery frame 17, and at least an upper face 17a of the battery frame 17 is fixed to a lower face of the depression 19 by bolts or the like. In other words, the battery frame 17 is partially overlapped with the right side sill 9 in the width direction of the vehicle 1. Likewise, although not especially shown in FIG. 2, the depressions 19 are also formed on the lower inner corners of the left side sill 10, the front cross member 13, and the rear cross member 14, and the depressions 19 of those members are also engaged with the battery frame 17 in a similar fashion.

The casing 18 is closed by a lid 18b, and a periphery 20 of the lid 18b is entirely overlapped with the inner flanges 16 of the right side sill 9, the left side sill 10, the front cross member 13, and the rear cross member 14. An annular sealing member 21 is interposed between an upper face of the periphery 20 of the lid 18b and the inner flanges 16 of the right side sill 9, the left side sill 10, the front cross member 13, and the rear cross member 14.

Figure 3:
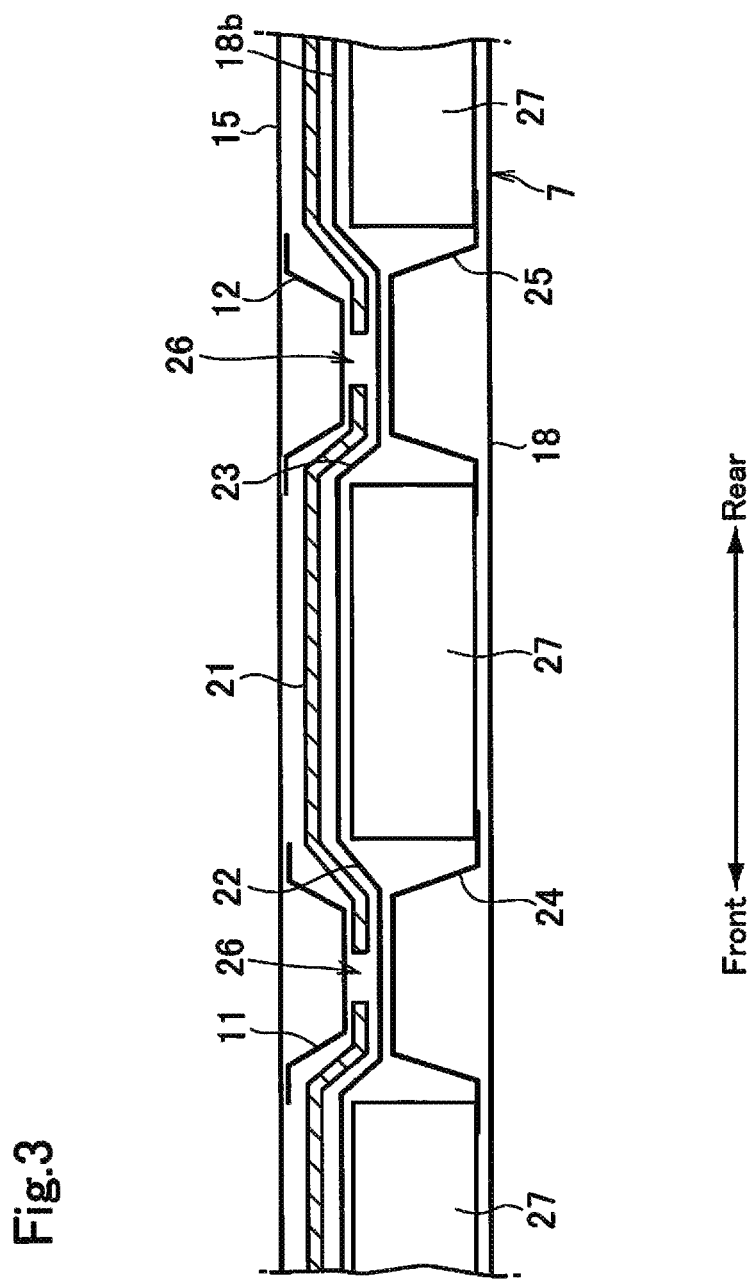
FIG. 3 is a cross-sectional view along the III-III line in FIG. 1.

FIG. 3 shows a cross-section of the battery mounting structure according to the first example along III-III line in FIG. 1. As illustrated in FIG. 3, the first floor cross member 11 and the second floor cross member 12 are situated underneath the floor panel 15. In the lid 18b of the casing 18, a first lateral depression 22 is formed in the width direction to hold the first floor cross member 11 therein, and a second lateral depression 23 is formed in the width direction to hold the second floor cross member 12 therein. A lower face of the bottom of the casing 18 is substantially flat and exposed to outside. Here, the bolts fixing the side sills 9 and 10 the battery pack 7 are omitted in FIG. 3 for the sake of illustration.

In order to enhance rigidity of the casing 18, a first lateral reinforce member 24 extends laterally between the right side sill 9 and the left side sill 10 underneath the first floor cross member 11, and a second lateral reinforce member 25 extends laterally between the right side sill 9 and the left side sill 10 underneath the second floor cross member 12. As illustrated in FIG. 3, the first lateral reinforce member 24 and the second lateral reinforce member 25 are individually depressed upwardly.

For example, the sealing member 21 may be made of rubber material, and the sealing member 21 is disposed entirely on the periphery 20 of the lid 18b. As illustrated in FIG. 3, in the first lateral depression 22, the sealing member 21 is interposed between the lid 18b of the casing 18 and the first floor cross member 11. Likewise, in the second lateral depression 23, the sealing member 21 is interposed between the lid 18b of the casing 18 and the second floor cross member 12. In addition, a drain hole 26 is formed in each of the first lateral depression 22 and the second lateral depression 23.

Figure 4:
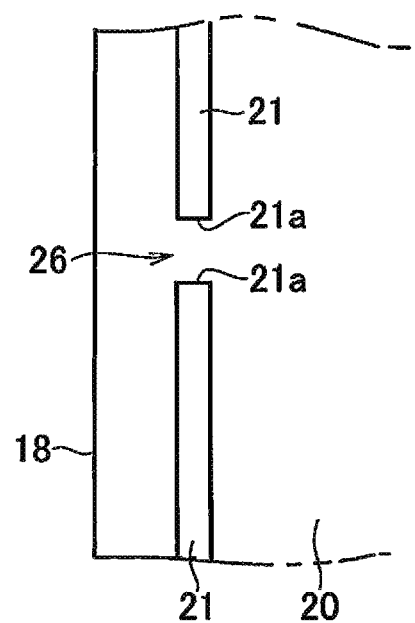
FIG. 4 is a schematic illustration showing one example of a drain structure.
Figure 4:
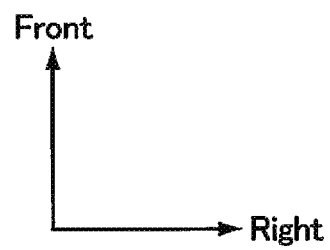
Figure 5:
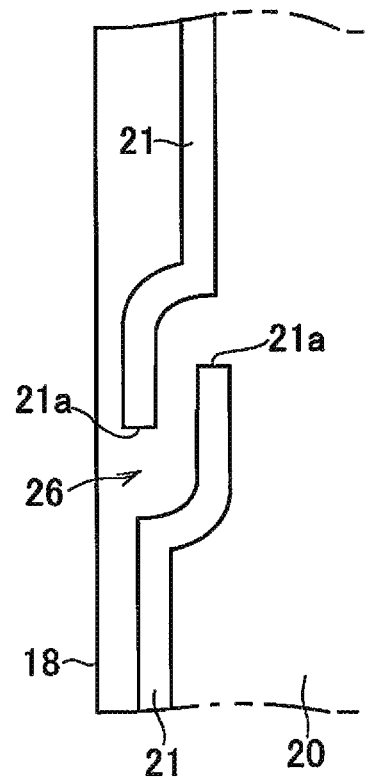
FIG. 5 is a schematic illustration showing another example of the drain structure.
Figure 5:
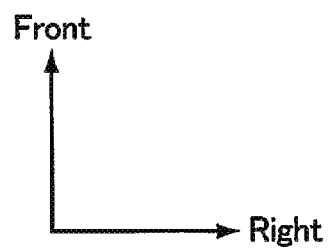

For example, as shown in FIG. 4, the drain hole 26 may be formed by partially cutting the sealing member 21 in such a manner as to maintain a clearance between end portions 21a. Instead, as shown in FIG. 5, the end portions 21a may also be overlapped with each other within a predetermined region so as to form a crank-shaped drain hole 26. Optionally, a labyrinth structure may be employed to form the drain hole 26. Alternatively, a plurality of the sealing member 21 may be arranged in a circular manner on the lid 18b of the casing 18 while keeping a clearance between end portions 21a to form the drain hole 26 shown in FIG. 4 or 5 in the first lateral depression 22 and the second lateral depression 23. In addition, the sealing member 21 may also be made of resin or adhesive agent instead of rubber.

Turning back to FIG. 1, in the casing 18, five sets of battery modules 27 are juxtaposed in the longitudinal direction at substantially regular intervals. The first lateral reinforce member 24 is disposed between the second and the third battery modules 27 from the front, and the second lateral reinforce member 25 is disposed between the third and the fourth battery modules 27 from the front. Each of the battery modules 27 includes a cell stack in which a plurality of single cells are juxtaposed in the width direction, and both ends of each of the battery module 27 is individually fixed to the casing 18. Optionally, a bottom of the battery module 27 may be fixed to side ends of the first lateral reinforce member 24 and the second lateral reinforce member 25.

Figure 6:
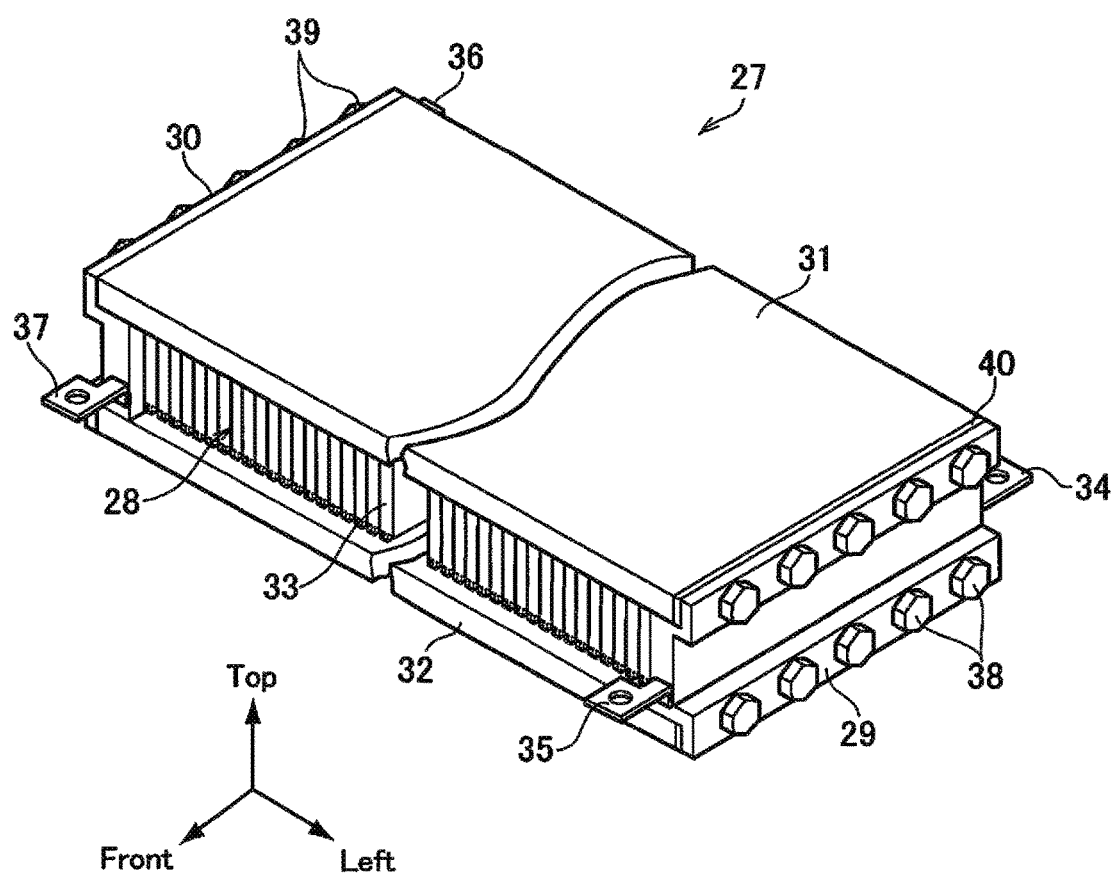
FIG. 6 is a perspective view showing one example of battery module.

Components of the battery module 27 as an all-solid battery are shown in FIG. 6 in more detail. As illustrated in FIG. 6, the battery module 27 comprises a first end plate 29, a second end plate 30, a first tension plate 31, a second tension plate 32, and a cell stack 28. Specifically, the fuel cell stack 28 is formed of a plurality of flat rectangular single cells 33 juxtaposed in the width direction of the vehicle 1. Each of the single cells 33 includes a positive electrode, a negative electrode, a solid electrolyte interposed between the electrodes, a positive terminal connected to the positive electrode, and a negative terminal connected to the negative electrode (neither of which are shown). The single cells 33 are connected in series, and the battery module 27 are connected to the motor 5 and a battery ECU through a harness (not shown).

The first end plate 29 and the second end plate 30 are situated on both width ends of the cell stack 28. The first end plate 29 is provided with a pair of fixing plates 34 and 35 at both ends and the second end plate 30 is provided with a pair of fixing plates 36 and 37 at both ends so that the battery module 27 is fixed to the casing 18 by screwing bolts (not shown) into bolt-holes of the fixing plates 34, 35, 36 and 37.

The first tension plate 31 is attached to the first end plate 29 and the second end plate 30 above the cell stack 28 by bolts 38 and 39, and the second tension plate 32 is attached to the first end plate 29 and the second end plate 30 below the cell stack 28 by the bolts 38 and 39. In order to adjust a clamping force for bundling the cell stack 28 by the first end plate 29 and the second end plate 30, a shim 40 is individually interposed between the first end plate 29 and the first tension plate 31, and between the first end plate 29 and the second tension plate 32. To this end, a thickness of the shim 40 may be adjusted in such a manner as to achieve a desired clamping force. For example, the clamping force for clamping the cell stack 28 by the first end plate 29 and the second end plate 30 may be increased by increasing thickness of the shim 40.

Each of the battery modules 27 is individually connected with a battery ECU (not shown) through a wire harness, and the battery ECU is configured to stabilize the power output of the single cell 33 while observing voltage. Specifically, the battery ECU is attached to a front face or a rear face of each of the battery modules 27 in the longitudinal direction of the vehicle 1, and the battery modules 27 are connected in parallel with one another to achieve a required capacity of the battery pack 7 to operate the motor 5.

Thus, in the battery mounting structure according to the first example, the sealing member 21 is disposed entirely on the periphery 20 of the lid 18b of the casing 18 to fill the clearance between the lid 18b and the inner flanges 16 of the right side sill 9, the left side sill 10, the front cross member 13, and the rear cross member 14. According to the first example, therefore, water intrusion into the clearance between the floor panel 15 and the battery pack 7 may be prevented. In addition, the drain hole 26 is formed in the sealing member 21 in each of the first lateral depression 22 and the second lateral depression 23. According to the first example, therefore, water condensed in the battery pack 7 flows into the first lateral depression 22 and the second lateral depression 23, and drained to outside of the vehicle 1 through the drain holes 26. That is, water accumulation on the lid 18b of the casing 18 can be prevented. Further, since the first floor cross member 11 and the second floor cross member 12 are disposed above the first lateral reinforce member 24 and the second lateral reinforce member 25, the first lateral depression 22 and the second lateral depression 23 may be formed without restricting an internal space of the casing 18 for arranging the battery modules 27.

Figure 7:
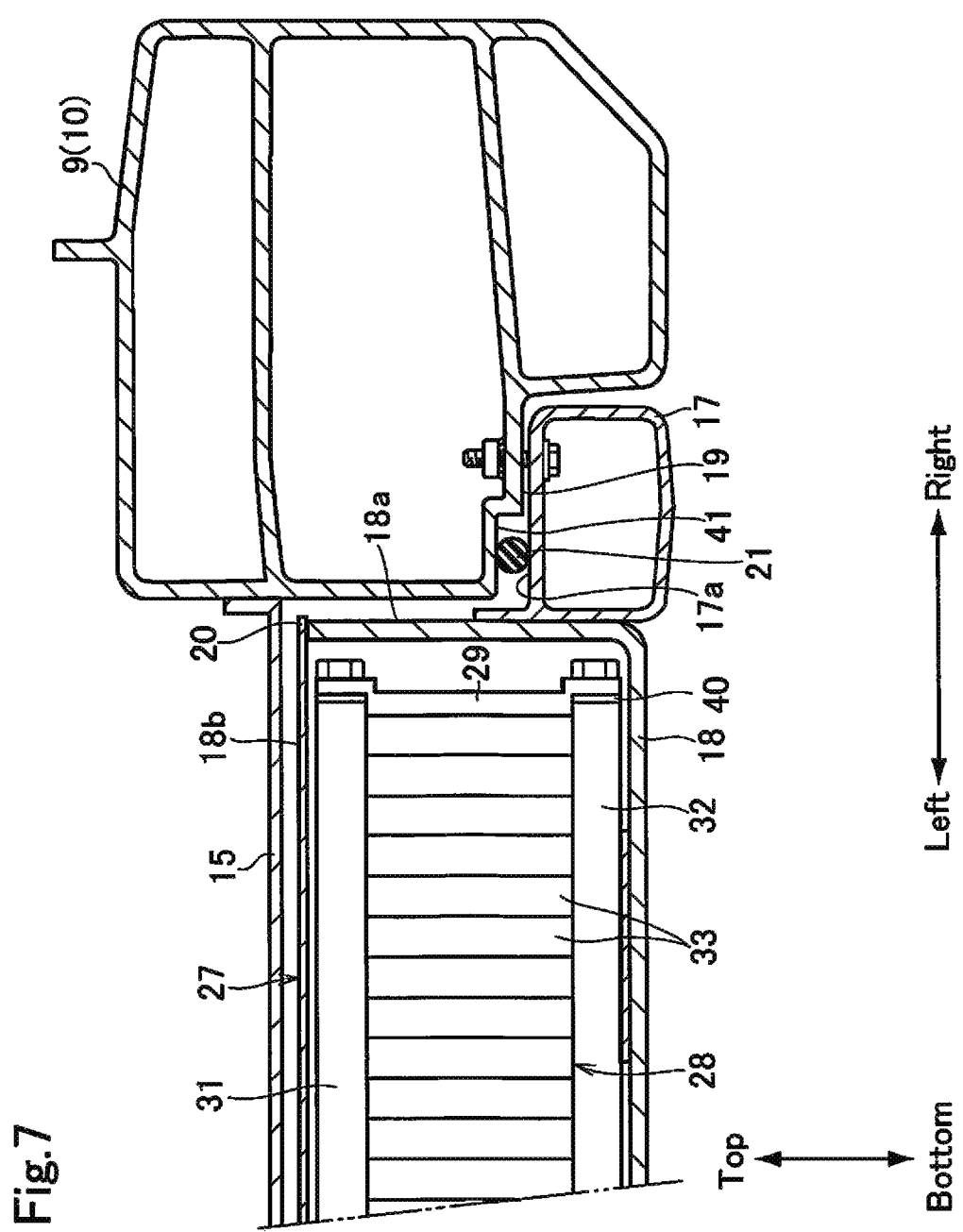
FIG. 7 is a partial cross-sectional view showing a second example of the battery mounting structure.

Turning to FIG. 7, there is shown a cross-section of the battery mounting structure according to the second example in which the sealing member 21 is interposed between the side right sill 9 and the battery frame 17 and between the left side sill 10 and the battery frame 17. According to the second example, the sealing member 21 is arranged on an upper face 17a of the battery frame 17 entirely around the casing 18. In the right side sill 9, the lower face of the depression 19 is depressed in the longitudinal direction of the vehicle 1 to form a second depression 41, and the sealing member 21 is interposed between the upper face 17a of the battery frame 17 and the lower face of the depression 19 in the second depression 41. Likewise, although not especially shown in FIG. 7, the second depression 41 is also formed individually in the depressions 19 of the left side sill 10, the front cross member 13, and the rear cross member 14, and the sealing member 21 is interposed between the upper face 17a of the battery frame 17 and the lower face of the depression 19 in the second depression 41. In the second example, the floor panel 15 is attached only to the right side sill 9 and the left side sill 10. The remaining structures are similar to those of the first example, and detailed explanations for the common elements will be omitted by allotting common reference numerals thereto. In the second example, accordingly, the upper face 17a of the battery frame 17 corresponds to the "periphery" of the battery pack.

Thus, according to the second example, the sealing member 21 is situated below the lid 18b of the casing 18 so that water intrusion into the casing 18 can be prevented more certainly. In addition, water condensed in the battery pack 7 also flows into the first lateral depression 22 and the second lateral depression 23, and drained to outside of the vehicle 1 through the drain holes 26.

Figure 8:
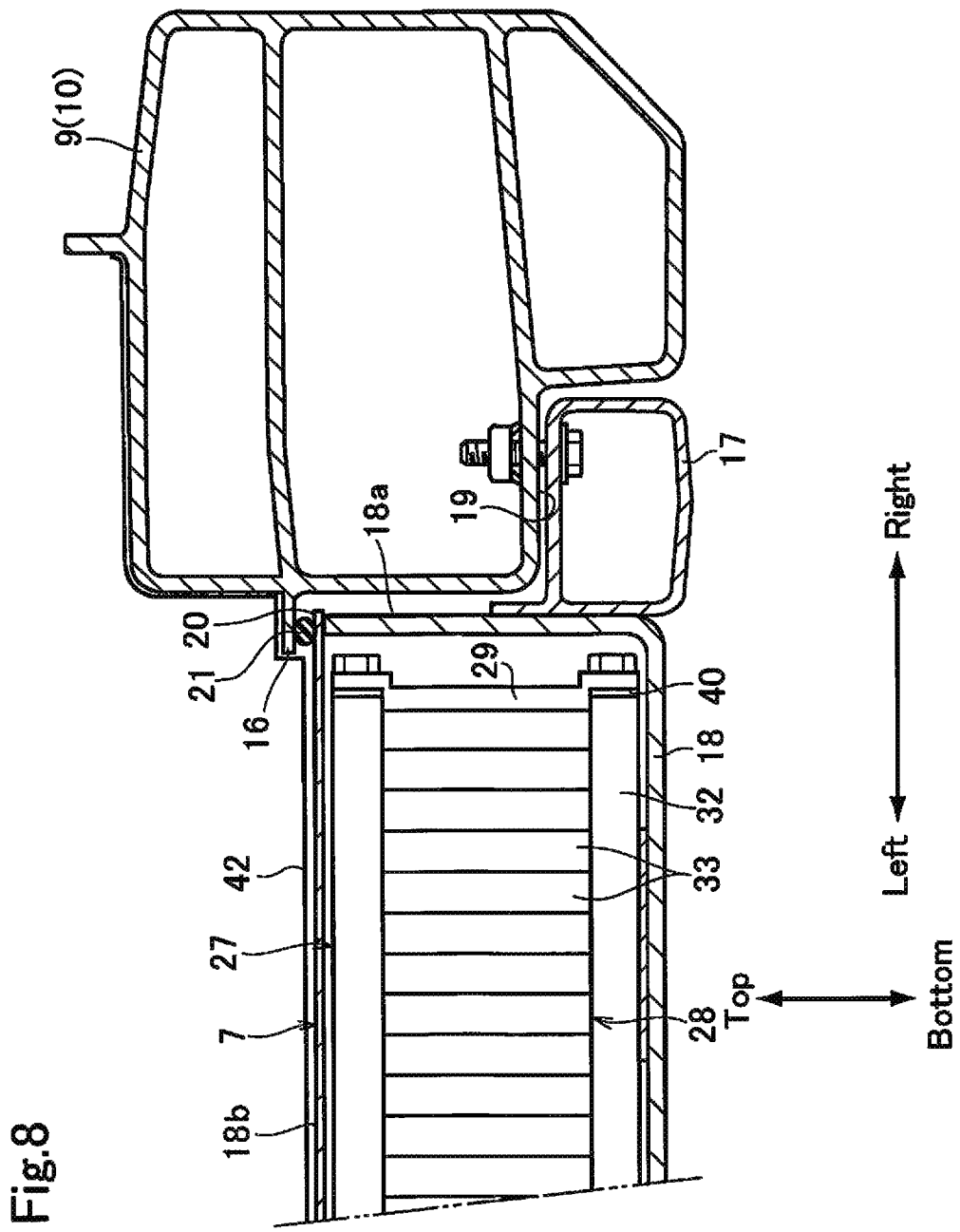
FIG. 8 is a partial cross-sectional view showing a third example of the battery mounting structure.

Turning to FIG. 8, there is shown a cross-section of the battery mounting structure according to the third example in which an interior material 42 such as a noise absorbing material, a carpet and so on is arranged on the lid 18b of the casing 18. In this case, the lid 18b of the casing 18 also serves as the floor panel 15. The remaining structures are similar to those of the first example shown in FIG. 2. According to the third example, therefore, a vehicle weight may be lightened and number of parts may be reduced by thus omitting the floor panel 15.

Turning to FIG. 9, there is shown the fourth example of the battery mounting structure in which the first floor cross member 11 and the second floor cross member 12 are disposed on the upper face of the floor panel 15. As depicted in FIG. 9, according to the fourth example, both of the first floor cross member 11 and the second floor cross member 12 are depressed upwardly. The remaining structures are similar to those of the first example shown in FIG. 3. According to the fourth example, water condensed in the battery pack 7 also drained to outside of the vehicle 1 through the drain holes 26.

Although the above exemplary embodiment of the present application have been described, it will be understood by those skilled in the art that the present application should not be limited to the described exemplary embodiment, and various changes and modifications can be made within the spirit and scope of the present application. For example, the battery mounting structures according to the foregoing examples may also be applied to hybrid vehicles and plug-in hybrid vehicles in which a prime mover includes an engine and at least one motor. In addition, the battery mounting structures according to the foregoing examples may also be applied to electric vehicles in which each wheel is individually driven by own motor.

What is claimed is:

1. A battery mounting structure, comprising:
   a pair of frame members extending in a vehicle longitudinal direction;
   a floor panel between the pair of frame members and connected with the frame members;
   a battery pack situated underneath the floor panel and disposed between the frame members, wherein the battery pack includes a battery frame and a cell stack, the battery frame being disposed underneath the frame members and being connected with the frame members at a first location; and
   a sealing member disposed at a second location, the second location being disposed between the frame members and the battery frame in a vehicle height direction and being located on a battery pack side of the first location,
   wherein the sealing member has a drain hole in the sealing member that connects an inner side of the sealing member with an outer side of the sealing member in a vehicle width direction.

2. The battery mounting structure as claimed in claim 1, wherein a depression is in the frame members and the sealing member is provided on the depression.

3. The battery mounting structure as claimed in claim 1, wherein the drain hole of the sealing member includes end portions isolated away from each other, and
   wherein the end portions are overlapped with each other within a predetermined region while keeping a predetermined clearance therebetween in a direction parallel to the top face of the battery pack.

4. The battery mounting structure as claimed in claim 1, wherein the cell stack comprises a plurality of single cells, and the battery pack is between the frame members in such a manner that the single cells are juxtaposed in the vehicle width direction.

5. The battery mounting structure as claimed in claim 1, wherein the battery pack includes a casing for holding the cell stack therein that is integrally formed with the battery frame, and the battery frame is attached around a lower part of sidewalls of the casing in such a manner as to align bottoms of the battery frame and the casing.

6. The battery mounting structure as claimed in claim 1, wherein a lower inner corner of the frame member comprises a depression engaged with the battery frame.

7. The battery mounting structure as claimed in claim 1, further comprising:
   a floor cross member extending in the vehicle width direction to connect the frame members; and
   a top face of the battery pack comprises a depression in the vehicle width direction along a contour of the floor cross member.

8. The battery mounting structure as claimed in claim 7, further comprising a drain hole in the sealing member at a portion between the depression and the floor cross member.

9. A battery mounting structure, comprising:
   a pair of frame members extending in a longitudinal direction;
   a battery pack between the frame members, wherein the battery pack includes a battery frame and a cell stack, the battery frame being connected with the pair of frame members at a first location such that at least one of the frame members is over the battery frame;
   a sealing member between the frame members and the battery frame such that the sealing member is between at least one of the frame members and the battery frame at a second location on a battery pack side of the first location; and
   a drain hole in the sealing member between the battery pack and the cross member.

10. The battery mounting structure of claim 9, wherein the at least one frame member has a recessed region with respect to the battery frame, and the sealing member is in the recessed region.

11. The battery mounting structure of claim 9, wherein the sealing member has a passage extending through the sealing member from a first side of the sealing member opposite to the at least one frame member to a second side of the sealing member facing the at least one frame member.

12. The battery mounting structure of claim 11, wherein the passage of the sealing member includes end portions of a material of the sealing member that are overlapped with one another.

13. The battery mounting structure of claim 9, wherein the cell stack comprises a plurality of single cells, and the single cells are juxtaposed in a direction extending from a first frame member of the pair of frame members to a second frame member of the pair of frame members.

14. The battery mounting structure of claim 9, wherein the battery pack includes a casing, the cell stack is inside the casing, and the battery frame extends away from the casing.

15. The battery mounting structure of claim 9, further comprising:
   a cross member connecting the frame members.

16. A vehicle, comprising:
   a pair of frame members extending in a length direction of the vehicle;
   at least two cross members connecting the frame members, the at least two cross members extending in a width direction of the vehicle;
   a battery pack between the frame members, wherein the battery pack includes a battery frame and a cell stack, the battery frame being connected with the pair of frame members at a first location such that at least one of the frame members is over the battery frame; and
   a sealing member between the frame members and the battery frame,
   wherein
   the sealing member is between at least one of the frame members and the battery frame at a second location on a battery pack side of the first location, and
   the sealing member has a drain hole extending from a battery pack side of the sealing member toward a frame member side of the sealing member.

17. The vehicle of claim 16, further comprising:
   a floor panel, wherein the battery pack is beneath the floor panel in a height direction of the vehicle.

\* \* \* \* \*